United States Patent [19]
Hauschild

[11] Patent Number: 5,311,171
[45] Date of Patent: May 10, 1994

[54] QUAD CHANNEL UNIT REGISTERS FOR CHANNEL PAIRS

[75] Inventor: Mark E. Hauschild, Parsippany Twp., Morris County, N.J.

[73] Assignee: AT&T Bell Laboratories, Murray Hill, N.J.

[21] Appl. No.: 814,949

[22] Filed: Dec. 30, 1991

[51] Int. Cl.⁵ .............................................. H04M 3/22
[52] U.S. Cl. ............................ 340/825.03; 379/27; 370/13; 371/20.1
[58] Field of Search ............... 340/825.03; 370/60, 370/71, 110.1, 13, 15, 56; 379/5, 27, 29; 371/20.1, 20.2, 49.1, 49.2; 364/200 MS, 900 MS

[56] References Cited

U.S. PATENT DOCUMENTS

| | | | |
|---|---|---|---|
| 4,371,949 | 2/1983 | Chu et al. | 364/900 |
| 4,949,355 | 8/1990 | Dyke et al. | 370/13 |
| 5,018,184 | 5/1991 | Abrams et al. | 370/15 |
| 5,046,067 | 9/1991 | Kimbrough | 370/56 |
| 5,165,039 | 11/1992 | Niehaus et al. | 364/247 |

Primary Examiner—Donald J. Yusko
Assistant Examiner—John Giust
Attorney, Agent, or Firm—Lester H. Birnbaum

[57] ABSTRACT

Disclosed is a circuit for storing and processing information in channel units servicing four channels in a digital loop carrier transmission system. Separate registers are provided for processing information related to different pairs of channels. However, one of the registers duplicates the information included in other register so that only a single register need to be addressed for a particular function.

10 Claims, 3 Drawing Sheets

FIG. 3

| FIRST HEALTH REGISTER | D7 | D6 | D5 | D4 | D3 | D2 | D1 | D0 |
|---|---|---|---|---|---|---|---|---|
| | TRA | TRB | REA | REB | QFLG | MOI | SB | JPU |

| SECOND HEALTH REGISTER | D7 | D6 | D5 | D4 | D3 | D2 | D1 | D0 |
|---|---|---|---|---|---|---|---|---|
| | TRA | TRB | REA | REB | TRC | TRD | REC | RED |

FIG. 4

| FIRST MASK REGISTER | D7 | D6 | D5 | D4 | D3 | D2 | D1 | D0 |
|---|---|---|---|---|---|---|---|---|
| | MTRA | MTRB | MREA | MREB | MQF2 | MQF1 | MMI2 | MMI1 |

| SECOND MASK REGISTER | D7 | D6 | D5 | D4 | D3 | D2 | D1 | D0 |
|---|---|---|---|---|---|---|---|---|
| | MTRA | MTRB | MREA | MREB | MTRC | MTRD | MREC | MRED |

FIG. 5

| FIRST FUNCTION REGISTER | D7 | D6 | D5 | D4 | D3 | D2 | D1 | D0 |
|---|---|---|---|---|---|---|---|---|
| | BENA | BENB | 0 | LED | 0 | DBS | OTRA | OTRB |

| SECOND FUNCTION REGISTER | D7 | D6 | D5 | D4 | D3 | D2 | D1 | D0 |
|---|---|---|---|---|---|---|---|---|
| | BENA | BENB | BENC | BEND | OTRC | OTRD | OTRA | OTRB |

QUAD CHANNEL UNIT REGISTERS FOR CHANNEL PAIRS

BACKGROUND OF THE INVENTION

This invention relates to digital loop carrier transmission systems.

In standard digital loop carrier transmission systems, such as the Subscriber Loop Carrier (SLC®) system, each channel unit (CU) interfacing with the customer provides service for two channels. Such channel units generally include registers for storing and processing information related to particular functions so that the information can be read by a bank controller unit (BCU). For example, a "health" register includes information related to the proper functioning of the unit.

In newer systems, each unit will service four channels, as well as provide enhanced services such as inventory and automatic loss control. Such "quad" channel units should be compatible with existing systems, and also handle additional information related to the two additional channels. At the same time, it is desirable to minimize the time needed to address the registers on the channel unit to optimize the operating speed of the system.

SUMMARY OF THE INVENTION

The invention is a channel unit for a digital loop carrier transmission system comprising a first register adapted to store information related to a first pair of communications channels and having a certain address. A second register is adapted to store information related to a second pair of channels and has a different address. Means are provided for addressing both registers so that certain bits of information related to the first two channels will appear at the address of both registers.

BRIEF DESCRIPTION OF THE DRAWING

These and other features of the invention are delineated in detail in the following description. In the drawing:

FIG. 3 is a block diagram of a pair of registers in accordance with the same embodiment;

FIG. 4 is a block diagram of a further pair of registers in accordance with an embodiment of the invention;

FIG. 5 is a block diagram of a still further pair of registers in accordance with an embodiment of the invention.

DETAILED DESCRIPTION

Figure 1:
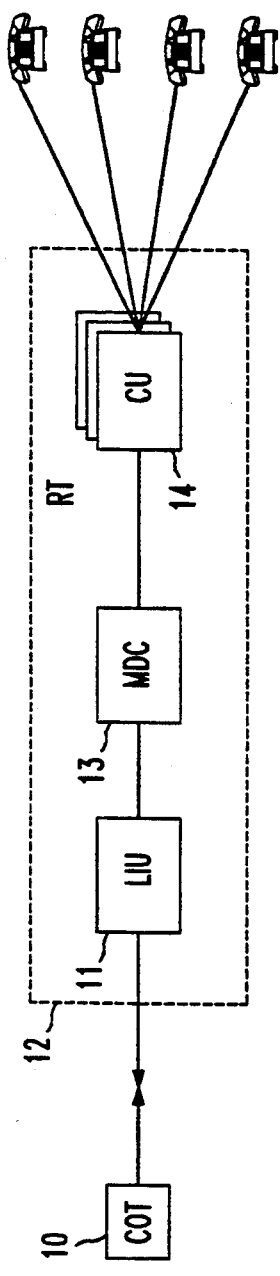
FIG. 1 is a block diagram of a portion of a typical digital loop carrier transmission system.

FIG. 1 illustrates some of the basic components of a digital loop carrier transmission system. Digital information is transmitted via a bidirectional link between a central office terminal (COT), 10, and a line interface unit (LIU), 11, which is part of a remote terminal (RT) 12. The LIU basically converts the time division frame signals between what is compatible with the COT and with the RT. The LIU is coupled to a metallic distribution controller (MDC), 13, which combines the features of prior art transmit-receive units (TRU) and bank controller units (BCU). That is, the MDC multiplexes or demultiplexes the signals for transmission to the COT or to the channel units (CU), respectively. The MDC also controls the various components of the remote terminal, only some of which are shown here. The MDC is coupled to the channel units (CU), e.g., 14, which provide the interface with the customers. In typical prior art systems, each channel unit would be coupled to two channels (i.e., two subscriber lines). In the new systems, each "quad" channel unit will be coupled to four channels, as illustrated.

Figure 2:
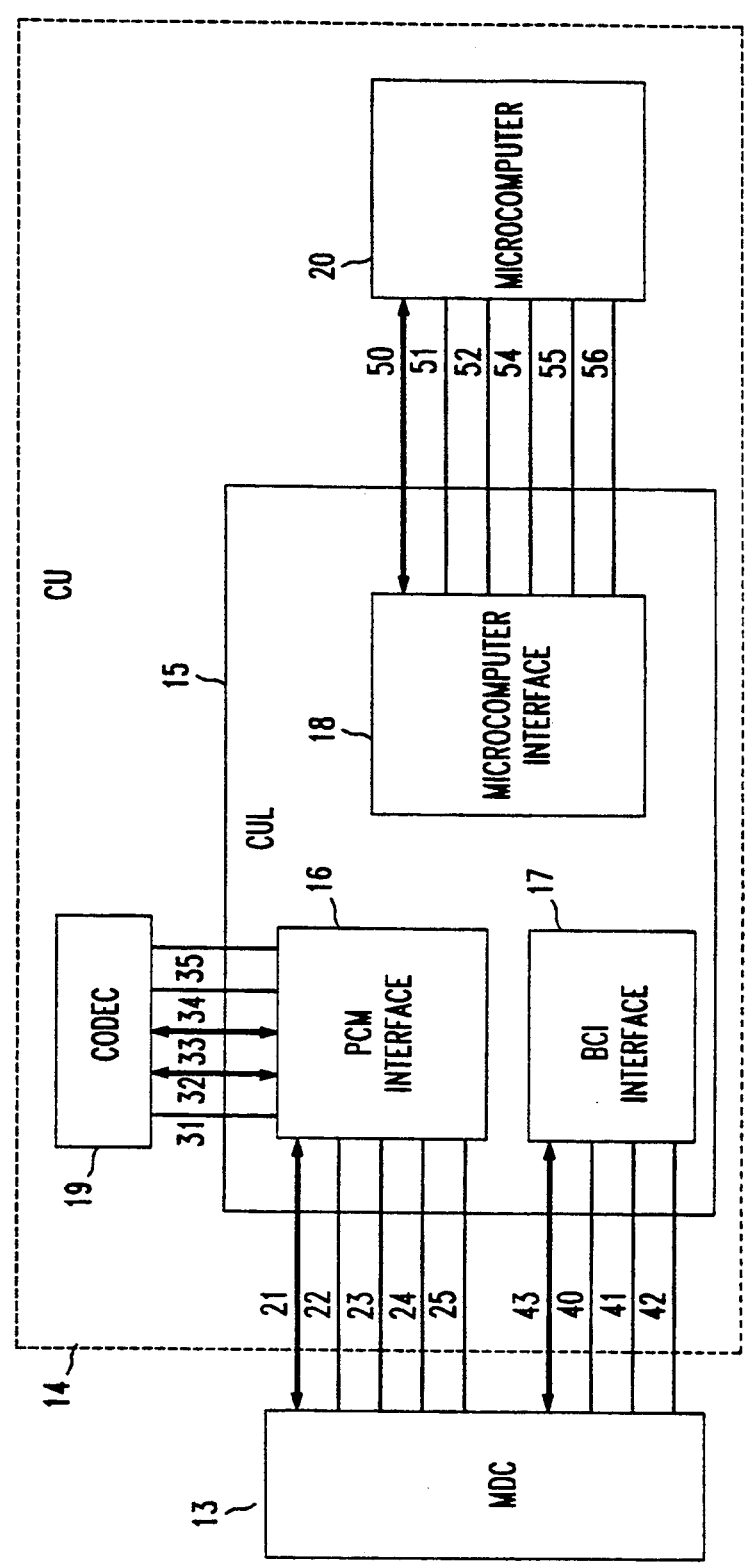
FIG. 2 is a block diagram of a channel unit in the transmission system which includes circuitry according to the invention.

FIG. 2 illustrates in more detail some of the components of a typical channel unit, 14. The channel unit includes a channel unit logic (CUL) chip, 15, which includes three interface circuits shown as boxes labelled PCM interface, 16, BCI interface, 17, and microcomputer interface 18. As the names imply, the PCM interface, 16, provides an interface for the PCM data signals transmitted between the channel unit and the MDC 13. It also provides an interface with the Codec, 19, which is part of the channel unit. The BCI interface, 17, provides the interface for signals transmitted between the channel units and the MDC which are related to the maintenance and control of the unit. It will be appreciated, therefore, that the PCM interface couples to the transmit-receive functions of the MDC and the BCI interface couples to the bank controller unit functions of the MDC. The microcomputer interface, 18, provides the interface between the channel unit logic chip and the microcomputer, 20, which is also located on the channel unit.

In some more detail, data between the PCM interface and MDC is transmitted via the data bus 21. Polling leads 22–25 determine which channel unit will be addressed by the MDC. Data between the PCM interface and the Codec is carried by data busses 32 and 33. A clock signal is sent over lead 31. Leads 34 and 35 provide synchronization signals for the transmitted and received data, respectively. The BCI interface is coupled to the MDC by an enable lead, 40, and a clock lead, 41, which together select the particular channel unit. A service request lead, 42, is utilized when the channel unit requires the attention of the MDC. Data is transmitted and received on the data bus 43. Data between the microcomputer interface and the microcomputer is transmitted on bus 50. A test lead 51 provides for testing of counters (not shown) in the microcomputer interface. An enable lead, 52, serves to reset an address counter (not shown) in the microcomputer interface so that the registers in the interface can be sequentially addressed. A serial clock signal from the microcomputer appears on line 54 in order to drive the interface, while a buffered clock signal is transmitted by the interface on lead 55 in order to allow the microcomputer to communicate with the Codec 19. A reset function is provided on line 56.

Of particular interest in the context of the present invention is the BCI interface, 17, which includes a plurality of registers. Two of these registers are illustrated in block form in FIG. 3. Each register includes 8-bits which are designated $D_7$–$D_0$. The type of bit in each position of the register is indicated by abbreviations which will be explained below. The registers are designated First Health and Second Health Registers since they primarily provide information to the MDC which requires service from the MDC.

The TRA bit which appears at the $D_7$ position in both registers indicates that the channel unit has received a request from outside the remote terminal to test channel "A". Thus, this bit alerts the MDC that a test procedure should be set up for that channel. Similarly, TRB, TRC and TRD indicate a request to test channels "B", "C" and "D", respectively. TRB appears at $D_6$ in both registers, while TRC appears at $D_3$ of the second register and TRD appears at $D_2$ of the second register.

The REA bit indicates that a relay on the channel unit coupling channel "A" has become stuck. This bit appears at $D_5$ of both registers. Similarly, REB, REC and RED indicate stuck relays for channels "B", "C", and "D", respectively. REB appears at $D_4$ in both registers, while REC appears at $D_1$ of the second register and RED appears at $D_0$ of the second register.

The MOI bit appearing at $D_2$ of the first register is part of the handshake routine between the MDC and channel unit, and indicates a service request by the channel unit to the MDC. SB is a safety bit which must be set before certain other service-affecting bits in other registers in the channel unit can be set. The JPU bit appearing at $D_0$ in the first register indicates a just powered up state to notify the MDC that a channel unit has been installed.

In accordance with a feature of the invention, it will be noted that the second register includes bits which are duplicates of the first four bits of the first register, i.e., TRA, TRB, REA and REB, in addition to including bits relating to channels C and D, i.e., TRC, TRD, REC and RED. That is, the bit positions $D_7$–$D_4$ of both registers are identical so that whenever the MDC reads and resets the bits in the second register, the bits in the first register relating to channels A and B will automatically be reset. Thus, all four channels are serviced by the MDC for a particular function by operating on a single register.

Two additional registers in the BCI interface which include this feature are illustrated in FIG. 4. These are "mask" registers since they are designed to mask conditions from the MDC once the MDC has responded to a service request involving that condition. Both registers include at $D_7$ an MTRA bit, which is a mask of a test request condition for channel A. That is, if TRA is set in the health registers of FIG. 3, the MDC will reset that bit after it responds to the service request. At that point the MTRA bit will be set in order to mask the condition from the MDC so that the TRA bit is not continually set while the condition persists. Likewise, the MTRB bit appearing at $D_6$ of both registers masks a test request of channel B.

The MREA bit appearing at $D_5$ of both registers masks a relay error on channel A, while the MREB bit appearing at $D_4$ will mask a relay error on channel B when set.

In the first register, the $MQF_2$ bit at $D_3$ or the $MQF_1$ bit at $D_2$ will mask the quad flag bit at a health register, (i.e., the QFLG bit at $D_3$ of the first register in FIG. 3). Further, the $MMI_2$ bit at $D_1$ or the $MMI_1$ bit appearing at $D_0$ will mask the MOI bit at a health register, (i.e., the bit at $D_2$ of the first register of FIG. 3).

In the second register of FIG. 4, the MTRC bit at $D_3$ and the MTRD bit at $D_2$ will mask test requests for channels C and D, respectively. The MREC bit at $D_1$ and the MREC bit at $D_0$ will mask relay errors on channels C and D, respectively.

FIG. 5 shows two additional registers in the BCI interface which utilize the features of the invention. These registers are designated "function" registers since they perform miscellaneous functions for each channel. Thus, BENA at $D_7$ and BENB at $D_6$ of both registers denies service to the customer on channels A and B during a pre-service condition. OTRA and OTRB which appear at $D_1$ and $D_0$, respectively, of both registers request the operation of test relays of channels A and B, respectively. $D_5$ and $D_3$ of the first register are left vacant. The LED bit at position $D_4$ indicates when an LED in the circuit pack is to be tested. The DBS bit at $D_2$ tells the channel unit not to stuff a "1" into a signaling slot at the beginning of a frame pattern. BENC and BEND appearing at $D_5$ and $D_4$, respectively, of the second register denies service to the customer on channels C and D, respectively. OTRC and OTRD appearing at $D_3$ and $D_2$, respectively, of the second register request the operation of test relays of channels C and D, respectively.

Figure 6:
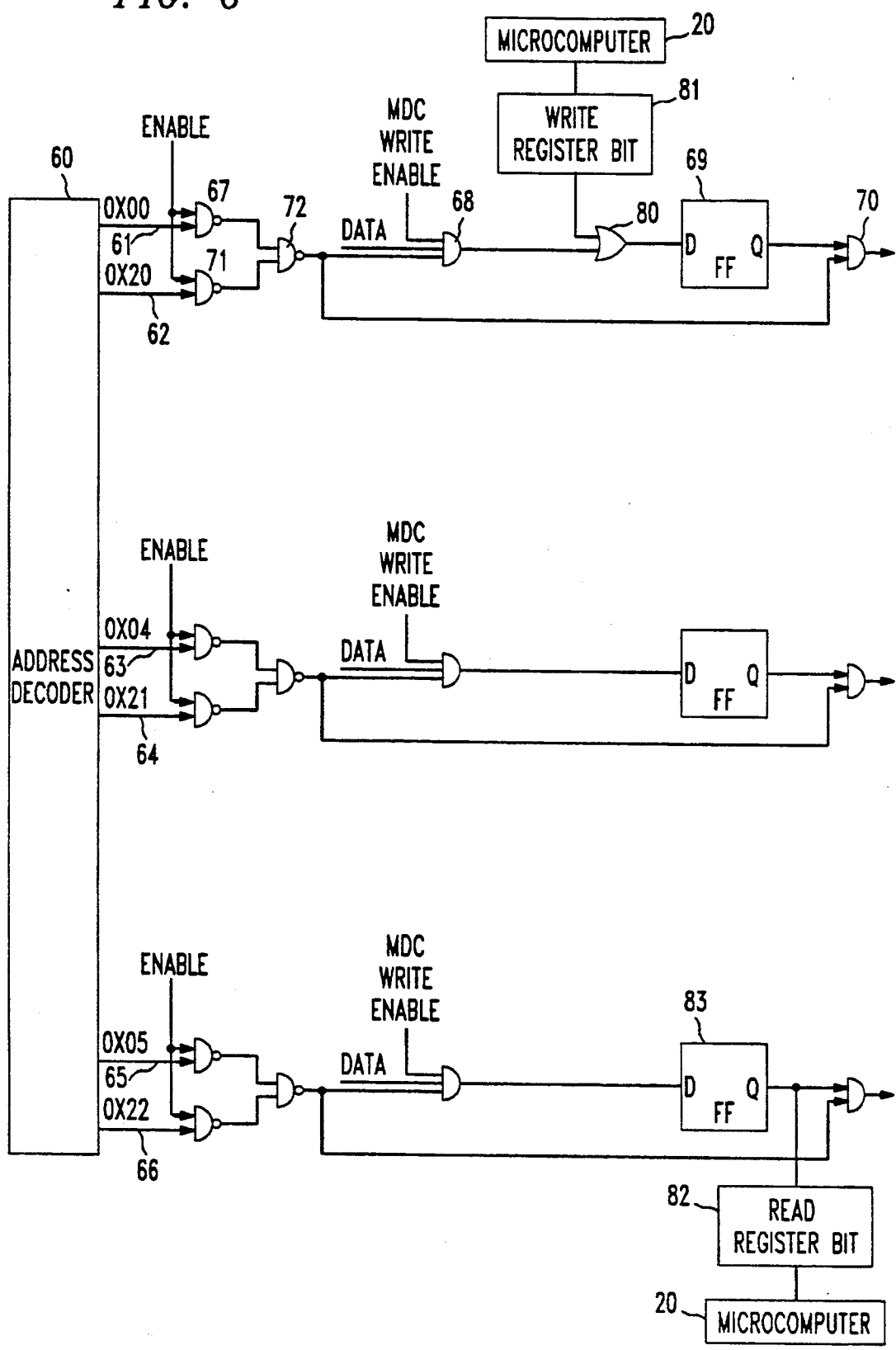
FIG. 6 is a schematic circuit diagram of a circuit for addressing registers in accordance with an embodiment of the invention.

FIG. 6 illustrates a circuit in accordance with the invention which is compatible with present dual channel unit systems and reduces the number of read/write operations for four-channel units. An address decoder, 60, receives signals from the MDC and sends signals to the register indicated in the data packet on one of its output lines, 61–66. Two output lines, 61 and 62, each carry signals for a particular address, in this case 0X00 and 0X20, which are the addresses for the health registers of FIG. 3. The lines 61 and 62 are coupled to NAND gates, 67 and 71. The other inputs of the NAND gates are coupled to an ENABLE signal from the microcomputer (20 of FIG. 2) through a write register at the microcomputer interface (18 of FIG. 2). The outputs of the NAND gates, 67 and 71, are coupled to another NAND gate, 72, so that the combination of NAND gates 67, 71, 72 essentially functions as an OR gate. Thus, if a "1" appears on either one of the lines 61 or 62, a "1" will appear at the output of gate 72. This output is coupled to an AND gate, 68, along with the data value which is to be written into the particular slots of the health registers (e.g., TRA which is written into slot $D_7$ of the first and second health registers of FIG. 3) and a write ENABLE signal from the MDC. If "1" are present at all three inputs, a "1" will appear at the output of the gate, 68, which is coupled through OR gate 80 to the input of a flip-flop circuit 69. The other input of the OR gate 80 is coupled to a write register bit, 81, controlled by microcomputer 20 so that the microcomputer can also write a bit into this slot in the health registers (see U.S. Patent Application of M. E. Hauschild, Case 1, filed on an even date herewith). A data bit of "1" will therefore appear at the Q terminal (output) of the flip-flop so that the data bit is written into the appropriate slots of the health register. This is, each of the duplicate slots $D_7$→$D_4$ of the first and second health registers of FIG. 3 will actually consist of one of the flip-flops such as 69, and once a particular bit is written into that flip-flop, it will essentially be written into the slots of both registers as far as the MDC and address decoder are concerned.

The output of the gate 72 is also coupled to an AND 70 along with the output of the flip-flop 69. The AND gate has its output coupled to the MDC. Thus, the "1" bit previously written into the flip-flop 69 is read by the MDC whenever a "1" appears at the output of the gate 72 in response to a read signal from the MDC through the address decoder 60 on one of the lines 61 or 62. (The MDC write ENABLE is set to "0" during a read operation so the signal does not pass gate 68.)

Similar read/write operations are performed for the mask registers and function registers when signals appear on lines 63 or 64 and 65 or 66, respectively. In this example, as indicated, line 63 represents the address 0X04, line 64 the address 0X21, line 65 the address 0X05 and line 66 the address 0X22. Addresses 0X04 and 0X21 are the addresses of the first and second mask registers, respectively, of FIG. 4, while 0X05 and 0X22 are the addresses of the first and second function registers, respectively, of FIG. 5.

It will be noted that a read or write signal on *either* address line (e.g., 61 and 62) directed to one of the two registers having a particular function (e.g., health) will automatically read or write a bit in the other register having the same function in the slots ($D_7 \rightarrow D_4$) which share the same flip-flop (e.g., 69). Thus, the time needed to operate on the registers is reduced.

It will also be noted that for any desired bit, a read register bit 82, can be coupled to the appropriate flip-flop circuit (e.g., 83) to permit the microcomputer 20 to read the bit.

Various modifications of the invention will become apparent to those skilled in the art. All such variations which basically rely on the teachings through which the invention has advanced the art are properly considered within the scope of the invention.

I claim:

1. A channel unit for a digital loop carrier transmission system comprising:
 a first register adapted to store bits of information related to a first pair of communications channels and having a certain address;
 a second register adapted to store information related to a second pair of communications channels and selected bits of information which are also stored in the first register and having a different address; and
 means for addressing both registers so that said selected bits of information related to the first pair of channels are accessed at the address of both registers.

2. The device according to claim 1 wherein each bit which appears at the address of both registers is written into a single flip-flop circuit which is shared by both registers.

3. The device according to claim 2 wherein the means for addressing comprises an address decoder with two lines coupled to a first set of NAND gates, each line adapted to transmit information to a different one of the addresses, and the output of the NAND gates being coupled to the flip-flop circuit.

4. The device according to claim 3 wherein the output of the NAND gates is coupled to the flip-flop through an AND gate.

5. The device according to claim 4 wherein another input of the AND gate is adapted for coupling to a metallic distribution controller so that the metallic distribution controller can write information into the flip-flop.

6. The device according to claim 3 further comprising a second AND gate having one input coupled to an output of the flip-flop circuit and another input coupled to an output of the set of NAND gates in order to permit the information in the flip-flop to be read out.

7. The device according to claim 1 wherein the first and second registers are adapted to include information requiring action by a metallic distribution controller.

8. The device according to claim 1 wherein the first and second registers are adapted to include bits which mask conditions from a metallic distribution controller.

9. The device according to claim 1 wherein the first and second registers are adapted to include bits which deny customer service to the channels and request operation of test relays on the channel.

10. The device according to claim 1 further comprising a microcomputer coupled to said registers.

* * * * *